(12) United States Patent
Jarvis et al.

(10) Patent No.: US 10,207,321 B2
(45) Date of Patent: Feb. 19, 2019

(54) MANUFACTURING OF A METAL COMPONENT OR A METAL MATRIX COMPOSITE COMPONENT INVOLVING CONTACTLESS INDUCTION OF HIGH-FREQUENCY VIBRATIONS

(71) Applicant: European Space Agency, Paris (FR)

(72) Inventors: David John Jarvis, Voorschoten (NL); Koulis Pericleous, Sutton Surrey (GB); Valdis Bojarevics, London (GB); Christian Lehnert, Bad Vilbel (DE)

(73) Assignee: European Space Agency, Paris (FR)

( * ) Notice: Subject to any disclaimer, the term of this patent is extended or adjusted under 35 U.S.C. 154(b) by 269 days.

(21) Appl. No.: 14/914,296

(22) PCT Filed: Aug. 29, 2013

(86) PCT No.: PCT/EP2013/067896
§ 371 (c)(1),
(2) Date: Feb. 25, 2016

(87) PCT Pub. No.: WO2015/028065
PCT Pub. Date: Mar. 5, 2015

(65) Prior Publication Data
US 2016/0199907 A1     Jul. 14, 2016

(51) Int. Cl.
*B22D 27/08*     (2006.01)
*B22D 1/00*     (2006.01)
(Continued)

(52) U.S. Cl.
CPC ............... *B22D 27/08* (2013.01); *B22D 1/00* (2013.01); *B22D 19/14* (2013.01); *B22D 19/16* (2013.01);
(Continued)

(58) Field of Classification Search
CPC ...................................................... C22B 9/003
(Continued)

(56) References Cited

U.S. PATENT DOCUMENTS 2,686,864 A     8/1954    Wroughton et al.
4,288,398 A *    9/1981    Lemelson ............... B21C 31/00
                                                         264/443
(Continued)

FOREIGN PATENT DOCUMENTS

| CH | 640438 A5 | 1/1984 |
| DE | 102011018675 A1 | 10/2012 |
| EP | 0754515 A1 | 1/1997 |

OTHER PUBLICATIONS

Machine Translation of DE102011018675A1 by Lexis Nexis Total Patent on Feb. 12, 2016.
(Continued)

*Primary Examiner* — Scott R Kastler
(74) *Attorney, Agent, or Firm* — Woodard, Emhardt, Henry, Reeves & Wagner LLP

(57) ABSTRACT

The present invention relates to a system for contactless induction of high-frequency vibrations in a volume of molten metal during the manufacturing of a metal component or a metal matrix composite component. The system includes a moveably arranged electromagnetic primary coil, adjustment means for adjusting the position of the primary coil, and a control unit for controlling the position of the primary coil to a predefined distance above, but not in contact with, an upper free surface of the molten metal. The molten metal may be contained in a foundry crucible during manufacturing. The system can be used as an additive manufacturing system, with the primary coil arranged above the melt pool. A secondary low-frequency electromagnetic coil may be
(Continued)

arranged around and at a distance from the molten metal to induce flow and/or vibrations in the molten metal.

16 Claims, 3 Drawing Sheets

(51) Int. Cl.

| | | |
|---|---|---|
| *B22D 19/14* | (2006.01) | |
| *B22D 19/16* | (2006.01) | |
| *B22D 27/02* | (2006.01) | |
| *B22F 3/105* | (2006.01) | |
| *C21C 5/52* | (2006.01) | |
| *C21C 7/00* | (2006.01) | |
| *C22C 32/00* | (2006.01) | |
| *C22C 33/04* | (2006.01) | |
| *C22C 47/08* | (2006.01) | |
| *B33Y 10/00* | (2015.01) | |
| *B33Y 30/00* | (2015.01) | |
| *B82Y 30/00* | (2011.01) | |

(52) U.S. Cl.
CPC ............ *B22D 27/02* (2013.01); *B22F 3/1055* (2013.01); *C21C 5/5241* (2013.01); *C21C 7/0037* (2013.01); *C22C 32/0015* (2013.01); *C22C 32/0063* (2013.01); *C22C 32/0068* (2013.01); *C22C 33/04* (2013.01); *C22C 47/08* (2013.01); *B22F 2003/1056* (2013.01); *B33Y 10/00* (2014.12); *B33Y 30/00* (2014.12); *B82Y 30/00* (2013.01); *Y02P 10/253* (2015.11); *Y02P 10/295* (2015.11)

(58) Field of Classification Search
USPC ........................................................ 266/234
See application file for complete search history.

(56) References Cited

U.S. PATENT DOCUMENTS

| | | |
|---|---|---|
| 4,523,628 A | 6/1985 | Vives |
| 6,391,247 B1 * | 5/2002 | Heine ..................... C22B 9/003 266/234 |
| 6,443,219 B1 | 9/2002 | Sasai et al. |
| 7,073,561 B1 | 7/2006 | Henn |
| 2016/0199907 A1 * | 7/2016 | Jarvis ..................... B22D 1/00 75/10.67 |

OTHER PUBLICATIONS

Machine Translation of CH640438A5 by Lexis Nexis Total Patent on Feb. 12, 2016.

* cited by examiner

US 10,207,321 B2

MANUFACTURING OF A METAL COMPONENT OR A METAL MATRIX COMPOSITE COMPONENT INVOLVING CONTACTLESS INDUCTION OF HIGH-FREQUENCY VIBRATIONS

FIELD OF THE INVENTION

The present invention relates to the manufacturing of a metal component or a metal matrix composite component by use of a system and a method involving contactless induction of high-frequency vibrations in a volume of molten metal during the manufacturing.

BACKGROUND OF THE INVENTION

Within the technology of casting of metals it is known to apply magnetic fields to the molten metal during manufacturing; this is known as electromagnetic stirring. U.S. Pat. No. 4,523,628 and U.S. Pat. No. 6,443,219 disclose manufacturing methods in which electromagnetic coils are arranged so that they surround the mould at areas where the generated magnetic fields can influence the metal during solidification by generating vibrations in the metal that can result in an improved homogeneous structure.

Application of vibrations during manufacturing in order to improve the microstructure are also known in relation to Metal-Matrix-Nano-Composites (MMNCs) which are alloys with greatly enhanced properties produced by the addition of nano-particles. They typically have around 50% higher strength than similar alloys without reinforcement. One of the problems in manufacturing these alloys concerns the difficulty in distributing the nano-particles evenly in the alloy matrix, especially where large components are to be manufactured. Today cast MMNCs are mixed and made using ultrasonic acoustic probes (sonotrodes) operating at frequencies around 20 kHz. The sonotrodes are immersed in the liquid material to encourage wetting of the NPs, the breaking up of agglomerations by cavitation and their distribution via sound-induced convection. Ultrasound treatment is also used during casting of unreinforced metals, such as for degassing and in order to refine the microstructure. The sonotrodes need to be replaced frequently as they erode in reactive metals and at the same time contaminate the melt. This may particularly be the case for materials having a high melting point, such as Ti, Fe, Mo and Zr. Furthermore, where a large volume is to be treated, multiple sonotrodes may be used, introducing complexity and increased cost.

OBJECT OF THE INVENTION

It is an object of the present invention to provide a system and a method with which the microstructure of a component can more efficiently be controlled and optimised than with known methods; this including the obtainment of a homogeneous distribution of reinforcement in composite materials.

It is another object of at least some embodiments of the present invention to provide a system and a method with which a more efficient, such as fast, manufacturing than with known methods can be obtained. This may especially be the case for large components.

It is an object of some embodiments of the present invention to provide a system and a method with which the frequent need to replace parts of the equipment, such as the sonotrodes used in prior art methods, can be avoided.

It is another object of some embodiments of the present invention to provide a system and a method with which contamination of the melted material due to the reaction between the melt and parts of the equipment can be avoided so that high purity components can be manufactured It is a further object of the present invention to provide an alternative to the prior art.

SUMMARY OF THE INVENTION

Thus, the above described object and several other objects are intended to be obtained in a first aspect of the invention by providing a system for contactless induction of high-frequency vibrations in a volume of molten metal during the manufacturing of a metal component or a metal matrix composite component, the system comprising:
  a moveably arranged electromagnetic primary coil,
  adjustment means for adjusting the position of the primary coil, and
  a control unit for controlling the position of the primary coil to a predefined distance above and not in physical contact with an upper free surface of the molten metal during use of the system.

When power is applied to the primary coil, the induced current in the molten metal will oppose that in the primary coil and the resulting electromagnetic field will produce the following effects:
  (1) it will repel the upper free surface of the molten metal away from the primary coil;
  (2) it will induce vibrations of the molten metal at a frequency twice that of the coil current; and
  (3) it will generate strong convection of material in a thin layer close to the free surface, also called the skin layer, leading to efficient mixing throughout the volume of molten metal.

When the system is used for the manufacturing of composite materials comprising particles, further effects are that:
  (4) it will have the capacity to induce cavitation, and the collapse of cavitating bubbles will disperse particle agglomerates so they can be distributed further by advection; and
  (5) agglomerations of generally non-conduction particles will be expelled by the electric current to the surface of the melt, where they will be broken up by electromagnetically induced pressure oscillations. The larger the particle, the greater the effectiveness of the expulsion force.

A result of these effects is that the electromagnetic field can be used to create particulate mixing and desirable grain refinement effects. The Lorentz force produces high intensity turbulence plus large scale flow motion, both contributing to good mixing. Ensuring the inductor is as close as possible to the melt surface maximises this effect. This is new physics and is considered to permit development of new products for melt treatment in metallurgy and sonochemistry. E.g. such methods can be used for satisfactory mixing of alloy components that would be hard to combine by prior art methods.

The movability of the primary coil means that the existence of a large static magnetic field as known from prior art methods can be avoided.

The distance between the primary coil and the upper free surface of the molten metal is adjusted so that at least some of the effects mentioned above are obtained.

The adjustment means are preferably electrical means comprising a power supply, a motor and a gearing so that the distance can be precisely controlled by the control unit. Maximum effect will be obtained when the EM magnetic coupling between the metal and induction coil is at a maximum. This can be detected by changes in the current/voltage delivered by the power supply, so the control unit should preferably be sensitive to such changes.

Lowering of the primary coil towards the free surface depresses the surface which maximises the region of electromagnetic vibrations and increases the effectiveness of the electromagnetic bulk stirring due to the mean component of the force.

When the system is used for the manufacturing of composite materials, the molten metal may contain reinforcement from the beginning, i.e. initially contained in the molten metal, or it may be added during the manufacturing e.g. either in particulate form or in the form of a composite feed material having a higher volume fraction of reinforcement than the final component; this will be explained in further details below.

The adjustment means may comprise a sensor for measuring the distance between the primary coil and the upper free surface of the molten metal during use. Signals from the sensor is transmitted to the control unit and used in the control of the position of the primary coil. The coil voltage/current response can also be used as a proximity sensor in the control system. Alternatively or in combination therewith, the parameters used to determine the distance may be obtained from separate equipment not forming part of the system.

The primary coil may operate at an adjustable frequency in the order of 10 kHz and/or at a current in the order of 1 kA. The current may also be adjustable. The possibility of tuning the frequency makes it possible to induce resonance to increase the amplitude of the vibrations and thereby the efficiency of the stirring effect. The frequency of the vibrations induced in the molten metal will be double that in the primary coil, i.e. in the order of 20 kHz; higher frequencies may also be used. Such a frequency is sufficient to cause sub-surface ultrasonic vibrations which make it possible to obtain a desired microstructure, e.g. including a homogenous distribution of reinforcement.

The primary coil is preferably vertically movable to ensure an easy adjustment of the distance to the free surface of the molten metal. In some embodiments the primary coil is movable in the vertical direction only. By having the movement in one direction only, it may be possible to ensure a simple and robust mounting and movement of the coil. A coil that moves along one axis makes it easier to tune the frequency for resonant conditions, increasing the intensity of vibrations.

In some embodiments of the invention, the primary coil is movable in three dimensions. This will e.g. be relevant when manufacturing components of non-axisymmetric geometries where the whole volume of molten metal cannot be influenced by one horizontal position of the coil. This movability in three dimensions may also be used to move the coil across the surface of a component being so large that it cannot be sufficiently influenced by the coil being in one horizontal position. Furthermore, this embodiment will be useful for an additive manufacturing process as will be described in further details below.

A system according to the present invention may further comprise a secondary low-frequency electromagnetic coil adapted to be arranged around and at a distance from the molten metal during use, the secondary coil being adapted to induce flow and/or vibrations in the molten metal.

By "around" is preferably meant that the secondary coil partially surrounds the molten metal to be influenced. It does not necessarily mean that all of the molten metal is placed in the cavity in the centre of the secondary coil.

By "low-frequency" is preferably meant in the order of 50 Hz. However, other frequencies are also considered to be covered, such as 20-100 Hz, 50 to 200 Hz or 40 to 300 Hz.

The main function of the low frequency coil is to induce flow in the melt so that molten metal passes through the ultrasonic region induced by the primary coil. Hereby it can be ensured that all of the material is influenced as desired. The low frequency is used is to provide penetration of the energy into larger volumes of the molten metal. The inclusion of such a secondary coil may therefore be particularly advantageous where large volumes of metal are to be treated. The low frequency induced current leads to a much thicker skin layer $\delta$, since $\delta$ is proportional to $1/\sqrt{f}$ where f is the frequency. The thicker skin layer results in a better mixing of the melt volume. A particular advantage of this embodiment is that the high frequency primary coil acts on the very thin skin layer of the molten metal near the surface and the power is therefore concentrated to a small, moving volume of material, the movement being induced by the low frequency coil.

The primary coil may be provided with an insulating coating at least on a part of the coil being closest to the molten metal during use. Such a coating can be used to protect the coil against inadvertent contact with molten metal, e.g. in the case of loss of power or other errors in the control process. This will particularly be a risk to avoid when treating high temperature metals, as the higher temperatures are more likely to damage the coil. The primary coil may be water cooled, and for such embodiments a main purpose of the coating is to protect the water-cooled coil in case of contact with the melt and prevent arcing. The protective coating may e.g. be an oxide layer, such as made from Boron Nitride (BN); it can e.g. be sprayed on the coil to obtain an adherent coating.

The system may further comprise a feed device through which further material can be added to the molten metal during manufacturing, the feed device preferably being arranged so that it is surrounded by the windings of the primary coil. Such a feed device may e.g. be in the form of a tube arranged within the primary coil. The feed device can e.g. be used to add nanoparticles or other types of reinforcement to a volume of molten metal. It can also be used to add nano-particulate masteralloys having a larger volume fraction of reinforcement than that for the final component. The feed device and its use will be described in further details in relation to the figures.

In some embodiments of the invention, the system comprises a foundry crucible containing the molten metal during manufacturing. The foundry crucible may also have been used for the melting of the metal, or molten metal may be poured into the foundry crucible. When the desired microstructure and possibly distribution of reinforcement has been obtained, the material is cooled in the foundry crucible. Further treatment, such as annealing of the component, may also be applied.

The inner cavity of the foundry preferably has a shape resembling that of the geometry of the final component, so that no or only little final machining is necessary. The foundry crucible may e.g. be of a size adapted to contain 10-100 kg of material. It should be made from a material which can withstand the whole process, including the temperature of the molten metal; preferably without reacting chemically with the materials involved. In embodiments comprising a secondary coil, this secondary coil will typically be arranged around an outer circumference of the foundry crucible containing the molten metal.

A second aspect of the invention relates to a method of manufacturing a metal component or a metal matrix composite component by use of a system according to any of the preceding claims, the method comprising the steps of:
- providing a molten metal of which the component is to be at least partly composed,
- arranging the electromagnetic primary coil movably above the molten metal,
- adjusting the vertical position of the primary coil to a predefined distance above and not in physical contact with an upper free surface of the molten metal,
- applying power to the primary coil so that an electromagnetic field is obtained,
- adjusting the vertical position of the primary coil to maintain the predefined distance, and
- maintaining the electromagnetic field for a predefined period of time so that a desired microstructure is obtained in the component being manufactured.

In some embodiments of the invention, this second aspect of the invention relates to a method of manufacturing a metal component or a metal matrix composite component by use of a system according to any of the preceding claims, the method comprising the steps of:
- providing a foundry crucible containing at least molten metal,
- adjusting the vertical position of the primary coil to a predefined distance above and not in physical contact with an upper free surface of the molten metal,
- applying power to the primary coil so that an electromagnetic field is obtained,
- adjusting the vertical position of the primary coil to maintain the predefined distance, and
- maintaining the electromagnetic field for a predefined period of time so that a desired microstructure is obtained in the component being manufactured.

The primary coil will preferably be maintained in a position resulting in an optimal penetration depth typically determined by computer simulations. Such simulations may e.g. be based on advanced magneto-hydrodynamic (MHD) models, and they will e.g. be used to optimise the coil and power specifications for a particular metal alloy. The modelling is e.g. used to examine the time dependent response of the metal free surface to the coil position, the amplitude of induced vibrations and resulting sound wave propagation, the efficiency of the particle dispersion mechanism, etc.

The method may further comprise the steps of adding material to the molten metal in the foundry crucible and adjusting the vertical position of the coil accordingly. As described above, this material being added may e.g. be reinforcement or a masteralloy, and it may be added through a feed device being arranged so that it is surrounded by the windings of the primary coil. In the control and adjustment of the position of the primary coil, it will be necessary to take the additional material into account not only with respect to added volume but also with respect to possible variations in the material properties.

The method may further comprise the steps of arranging a secondary low-frequency electromagnetic coil around an outer circumference of the foundry crucible containing the molten metal and applying power to the secondary coil so that flow and/or vibrations are induced in the molten metal. The secondary coil may be used to induce vibrations, e.g. in the order of 50 Hz, as described above.

In alternative embodiments of the invention, this second aspect of the invention relates to a method of manufacturing a metal component by additive manufacturing by use of a system as described above, the method comprising the steps of:
- providing a work surface on which the component is to be manufactured,
- providing at least one deposition material from which the component is to be composed,
- advancing the deposition material to a localized deposition area where it is added to the component being manufactured,
- providing heat to the deposition area so that a free-standing melt-pool at least comprising metal is provided, so that the deposition material is deposited for building up the component, and
- mutually moving the work surface and the deposition material in a way that results in the additive manufacturing of the component, wherein the method further comprises the steps of:
- adjusting the vertical position of the primary coil to a predefined distance above and not in physical contact with an upper free surface of the melt-pool,
- applying power to the primary coil so that an electromagnetic field is obtained, and
- adjusting the vertical position of the coil to maintain the predefined distance.

By "deposition material" is meant the consumable material from which the component is to be made. It may e.g. be provided in wire form. By using wires, the deposition material itself is self-supporting in solid form and can thus be gripped and forwarded by mechanical means, such as reels or pinch rollers driven by motors. The wire is typically melted onto the component being manufactured to incrementally form the component by traversing it in x, y and z directions.

The deposition area is the area where the depositing of the deposition material onto the component takes place. The actual extension of this area may not be sharply delimited e.g. because the heating may influence the material in a larger area than what is directly hit by the focused energy beam providing the heat. How large an area that becomes hot enough to be influenced is material dependent. Furthermore, in embodiments where the deposition material is caused to melt, the melted material may also spread over a larger area than that directly hit by the focused energy beam. The melt-pool may e.g. have a size in the order of 1 $cm^3$.

In this embodiment relating to additive manufacturing, the main advantages are related to melt-pool agitation and grain refinement which result in good alloy mixing, dendrite fragmentation, breaking down the grain structure to fine equiaxed grains, avoiding epitaxial columnar grain growth and generally improving the mechanical properties of the component made by the additive manufacturing.

In any of the embodiments as described above, the metal may be selected from aluminium, magnesium, titanium, zirconium, beryllium, steel, copper, nickel and cobalt.

The method may be used to manufacture a metal matrix composite comprising reinforcement made from one or more of the following: $SiC$, $ZrO_2$, $Y_2O_3$, $Al_2O_3$, $MgO$, and $AlN$. A characteristic size of the reinforcement may be 10-1000 nm, such as 10 to 100 nm, 100 to 500 nm or 500 to 1000 nm. A characteristic size may e.g. be an average diameter in case of particles or an average length in case of fibres.

As explained above, a beneficial effect of the electromagnetic field when manufacturing nano-particulate composite materials is that it induces cavitation and the collapse of cavitating bubbles will disperse particle agglomerates so that they can be distributed further by advection. Furthermore, agglomerations of generally non-conducting particles will be expelled by the electric current to the surface of the melt, where they will be broken up by electromagnetically induced pressure oscillations. Hereby a homogeneous distribution of the nano-particles can be obtained resulting in improved mechanical properties as compared to composites where the nano-particles form agglomerates.

A third aspect of the invention relates to a metal component or a metal matrix composite component manufactured by a method according to the present invention or by use of a method according to the present invention.

The first, second and third aspect of the present invention may each be combined with any of the other aspects. These and other aspects of the invention will be apparent from and elucidated with reference to the embodiments described hereinafter.

The work leading to this invention has partially received funding from the European Union Seventh Framework Programme (FP7/2007-2013) under contract number EC-FP7-NMP-280421.

BRIEF DESCRIPTION OF THE FIGURES

The system and method according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
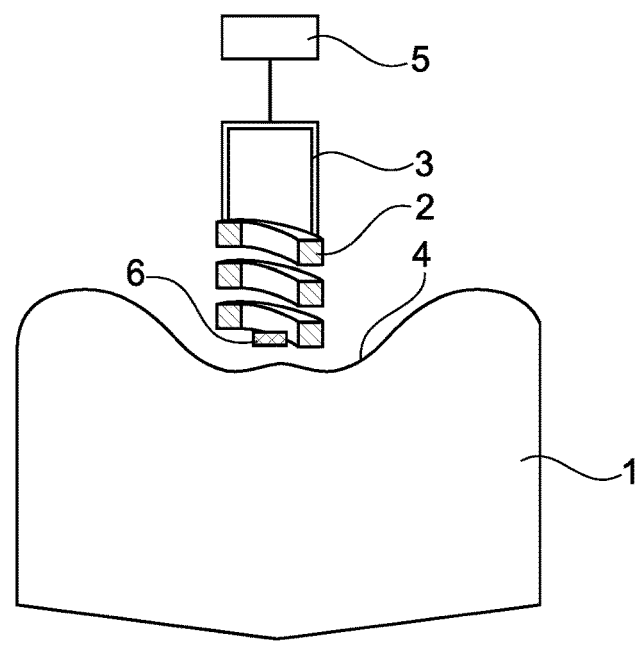
FIG. 1 shows schematically and in a cross sectional view a primary coil arranged above and at a distance from an upper free surface of a volume of molten metal.

FIG. 1 shows schematically an example of a system for contactless induction of high-frequency vibrations in a volume of molten metal 1 during the manufacturing of a metal component or a metal matrix composite component. An electromagnetic primary coil 2 is moveably arranged above the volume of molten metal 1, and adjustment means 3 are used for adjusting the position of the primary coil 2 in relation to the upper free surface 4 of the molten metal 1. The curved/depressed shape of the upper free surface 4 shown in the figure results from the influence from the electromagnetic field as will be described below. The system further comprises a control unit 5 for controlling the position of the primary coil 2 to a predefined distance above and not in physical contact with the upper free surface 4 of the molten metal 1 during use of the system. The control unit 5 may be arranged close to the remainder of the system or at a distance therefrom. It will typically comprise a computer (not shown) which can also be used for inputting data and for monitoring the manufacturing process. The adjustment means 3 typically also comprises a sensor 6 for measuring the distance between the primary coil 2 and the upper free surface 4 of the molten metal 1 during use. In the figure, the sensor 6 is shown as arranged on the primary coil 2 for illustrative purposes only; it may also be arranged at other positions, such as directly on the part of the adjustment means 3 to which the primary coil 2 is mounted.

The shape of the primary coil 2 is typically cylindrical as shown in the figures, but it can also have other shapes, such as conical or flat (pancake). The primary coil 2 preferably operates at an adjustable frequency in the order of 10 kHz and/or at a current in the order of 1 kA. The actual values will depend on the size of the application.

Figure 2:
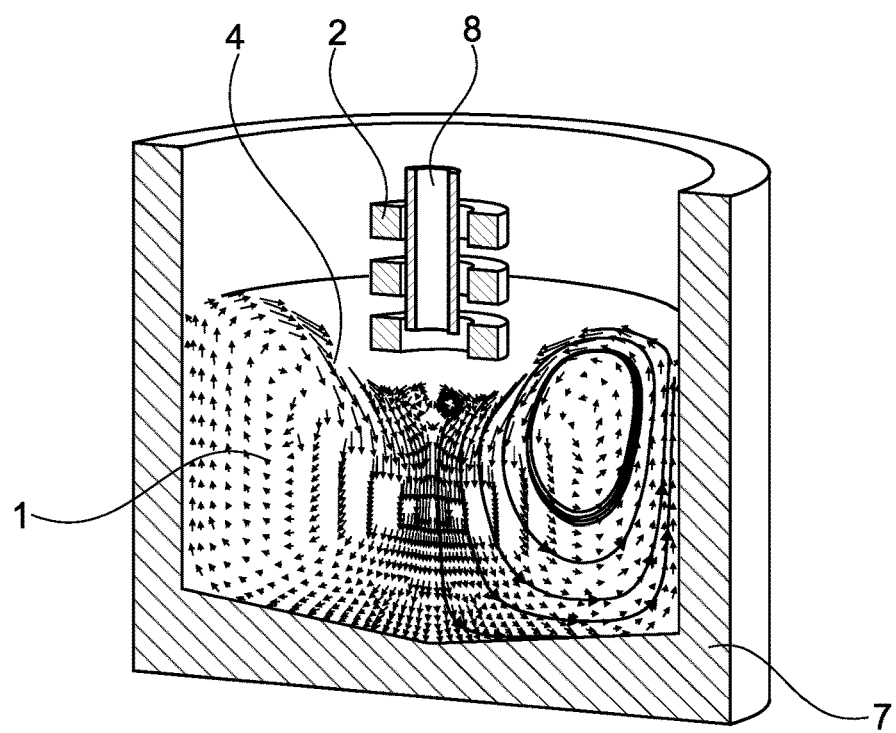
FIG. 2 shows schematically a three-dimensional cross sectional view of an embodiment of the invention, where the molten metal is contained in a foundry crucible.

The embodiment of the invention shown in FIG. 2 comprises a foundry crucible 7 containing at least molten metal 1 and possibly also reinforcement material, such as micro- or nano-particles or fibres. The systems shown in FIGS. 1 and 2 are used by performing the following steps:

adjusting the vertical position of the primary coil 2 to a predefined distance above and not in physical contact with an upper free surface 4 of the molten metal 1, applying power to the primary coil 2 so that an electromagnetic field is obtained, adjusting the vertical position of the primary coil 2 to maintain the predefined distance, and maintaining the electromagnetic field for a predefined period of time so that a desired microstructure is obtained in the component being manufactured.

The system may further comprise a feed device 8 through which material can be added to the molten metal 1 during manufacturing. In FIG. 2 this feed device 8 is in the form of a tube which is arranged so that it is surrounded by the windings of the primary coil 2. The upper end of the tube may extend e.g. to a container (not shown) containing the material to be added, or it may have a shorter length as shown in the figure.

Examples of metals which can be used for manufacturing components by use of the present invention are aluminium, magnesium, titanium, zirconium, beryllium, steel, copper, nickel and cobalt. When the method is used to manufacture a metal matrix composite, the reinforcement may e.g. be made from one or more of the following materials: SiC, $ZrO_2$, $Y_2O_3$, $Al_2O_3$, MgO, and AlN. The reinforcement will typically be in particulate form, but other types, such as fibres or platelets are also possible.

In the case of composite materials, the material being added during manufacturing may be in the form of a master alloy having a high volume fraction of reinforcement. If such a masteralloy, e.g. in wire form, is added into an initially unreinforced metal, a final component having a lower volume fraction of reinforcement can be obtained in a more efficient and controllable manner than what is possible by prior art methods.

When material is added to the molten metal 1 in the foundry crucible 7, the vertical position of the primary coil 2 will be adjusted accordingly so that the desired distance to the upper free surface 4 is maintained. An optimal distance may be dependent on the electromagnetic properties of the material in the foundry crucible 7, and these may depend on the composition of the material. Therefore the distance may have to be varied during addition of material, e.g. in the form of reinforcement. If the material is added in wire form, it could in principle be added without a feed device, but it is still considered advantageous to feed it via e.g. a tube in order to guide it safely to the desired point of addition to the molten metal 1 with the tube protecting both the primary coil 2 and the wire material.

The primary coil 2 has to be at least vertically movable in order to adjust and optimise the distance to the upper free surface 4 of the molten metal 1. In some embodiments, such a one-direction movement is sufficient, whereas in others it is necessary that the primary coil 2 is movable in three dimensions. This will e.g. be relevant when manufacturing components of non-axisymmetric geometries where the whole volume of molten metal cannot be influenced by one horizontal position of the coil. This movability in three dimensions may also be used to move the primary coil 2 across the upper free surface 4 being so large that it cannot be sufficiently influenced by the primary coil 2 being in one horizontal position only.

Figure 3:
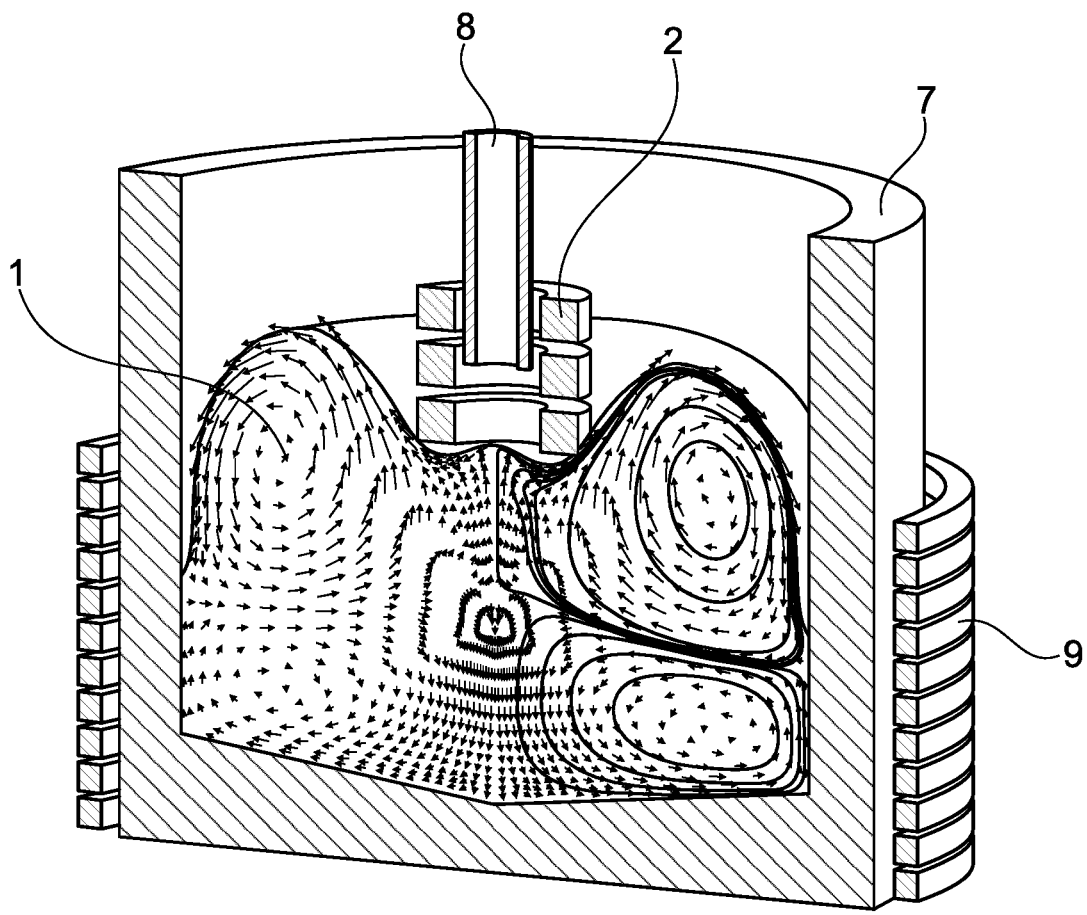
FIG. 3 shows schematically a three-dimensional cross sectional view of an embodiment of the invention, where a secondary coil is arranged around the foundry crucible.

FIG. 3 shows another embodiment comprising a secondary low-frequency electromagnetic coil 9 arranged around the foundry crucible 7 containing the molten metal 1. This secondary coil 9 is used to induce flow and/or vibrations in the molten metal 1. The vibrations induced by the secondary coil 9 are typically in the order of 50 Hz. The main function of the secondary coil 9 is to induce flow in the melt so that molten metal passes through the ultrasonic region induced by the primary coil 2. Hereby it can be ensured that all of the material is influenced as desired. The low frequency is used is to provide penetration of the energy into larger volumes of the molten metal 1. The inclusion of such a secondary coil 9 may therefore be particularly advantageous where large volumes of metal are to be treated.

Figure 4:
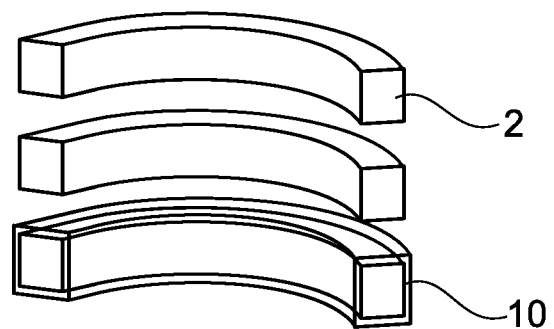
FIG. 4 shows schematically a coil having a lower part covered by a protective coating.

The primary coil 2 will in some embodiments of the invention be provided with an insulating coating 10 at least on a part of the coil 2 being closest to the molten metal 1 during use. An example of such a coil is shown schematically in FIG. 4.

Figure 5:
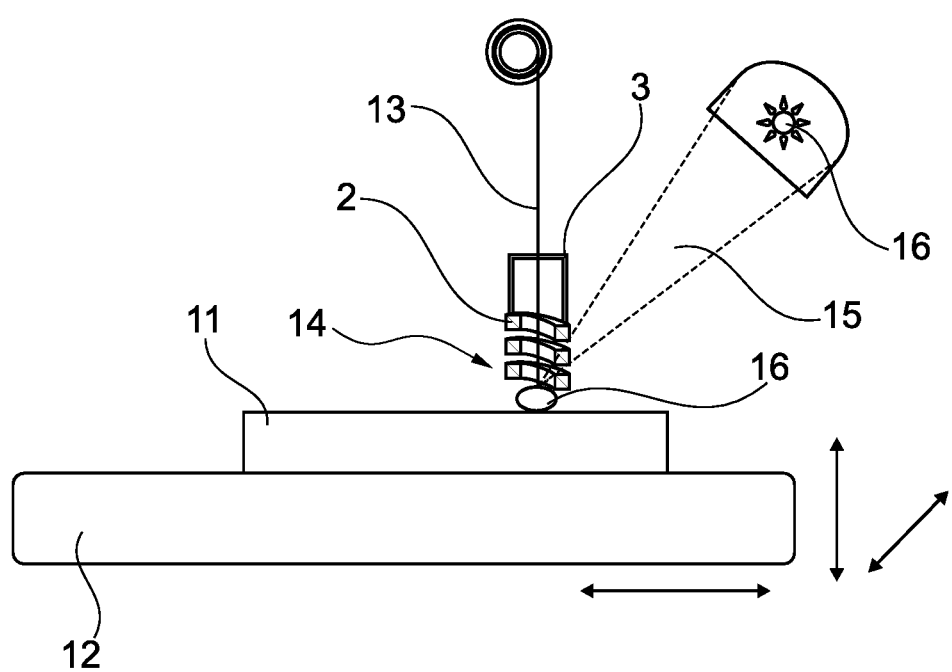
FIG. 5 shows schematically an embodiment of the invention, where the method is related to an additive manufacturing method.

In another embodiment, the invention is used for manufacturing a metal component by additive manufacturing. An example of a system for such a method is shown schematically in FIG. 5. ##The following is taken from the photam-application and amended to "match" the present invention##.

The component 11 is being manufactured on a work surface 12 which in the illustrated embodiment can be moved in three dimensions, as indicated by arrows, while the rest of the system is not moved. In the figure, the at least one deposition material from which the component 11 is to be composed is arranged above the work surface 12. The deposition material 13 is shown in the form of one wire 13, but it could also be more wires. The deposition material is advanced to a localized deposition area 14 where it is added to the component 11 being manufactured. It is preferably passed via the central opening in the primary wire 2 as shown in the figure. As described above, it may also be advantageous to supply the wire 13 via a feed device 8, but this option is not included in FIG. 5 for clarity of the figure only. This deposition is obtained by focusing at least one energy beam 15, such as a light beam, emitted from at least one heating source 16 in the deposition area so that the deposition material 13 is deposited for building up the component 11. In the illustrated embodiment, the work surface 12 is moved in relation to the energy beam 15 and the deposition material 13 along three-dimensional paths in a way that results in the additive manufacturing of the component 11. Similar to the method as described above, the additive manufacturing method shown in FIG. 5 comprises the following steps:

adjusting the vertical position of the primary coil 2 to a predefined distance above and not in physical contact with the melt-pool 16, applying power to the primary coil 2 so that an electromagnetic field is obtained, and adjusting the vertical position of the primary coil 2 to maintain the predefined distance.

In this embodiment, the electromagnetic field cause melt-pool agitation and grain refinement which result in good alloy mixing, dendrite fragmentation, breaking down the grain structure to fine equiaxed grains and generally improving the mechanical properties of the component made by the additive manufacturing. The deposition material being added may e.g. be in the form of a wire, such as a wire being a master alloy as described above.

To summarize, the following advantages are considered to be obtainable by at least some embodiments of the present invention:

(i) It is a contactless design, so that there is no need to replace the coil element after a few runs as it is required with a sonotrode.

(ii) There is no risk of contamination of the melted material due to the reaction between the melt and the coil, since there is no contact. This opens the route for high purity components as required by certain industries.

(iii) Currently sonotrodes have to have a higher melting point than the metal they are treating. The new design can be applied to high temperature melts, such as the various titanium alloys now being considered for aerospace application.

(iv) Electromagnetic forcing can produce strong stirring in the melt due to the Lorentz force, in contrast to the weak stirring present in acoustic streaming. This means larger volumes can be treated, or alternatively similar volumes can be treated faster than with the ultrasonic probe.

(v) The induced currents tend to expel large size impurities on to the surface of the melt. In practice this means that agglomerated particles will be selectively ejected towards the energetic skin layer, where there is a higher opportunity for disaggregation. Once broken up, single NPs will be easily transported by advection.

(vi) The electromagnetic coil can be scaled down to smaller sizes in order to positively influence the microstructure formation during additive manufacturing (AM), leading to better AM parts.

The invention as described above may e.g. be used to produce lightweight components for use in transport and aerospace industries; especially for lightweight structural parts where high strength and stiffness are required. Nanocomposites of magnesium, aluminium, titanium and beryllium are thus very desirable. Likewise, the invention can be used for the production of nanocomposites for functional materials like superconductors, magnets and thermoelectrics.

Two examples of functional materials that could benefit from this invention are:

(i) superconducting alloys with finely-distributed nanoparticles for flux pinning; and (ii) thermoelectric composite materials with finely-dispersed nanoparticles for improving ZT values.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:
1. Method of manufacturing a metal matrix composite component that includes a non-metal by use of a system for contactless induction of high-frequency vibrations in a volume of molten metal during the manufacturing of a metal matrix composite component, the system including a moveably arranged electromagnetic primary coil, an adjustment means for adjusting the position of the primary coil, and a control unit for controlling the position of the primary coil to a predefined distance above and not in physical contact with an upper free surface of the molten metal during use of the system, the method comprising:
   providing a foundry crucible containing at least a molten metal of which the component is to be at least partly composed,
   arranging the electromagnetic primary coil movably above the molten metal,
   adjusting the vertical position of the primary coil to a predefined distance above and not in physical contact with an upper free surface of the molten metal,
   applying power to the primary coil so that an electromagnetic field is obtained,
   adjusting the vertical position of the primary coil to maintain the predefined distance,
   maintaining the electromagnetic field for a predefined period of time so that a desired microstructure is obtained in the component being manufactured,
   arranging a secondary low-frequency electromagnetic coil around an outer circumference of the foundry crucible containing the molten metal, and
   applying power to the secondary coil so that flow and/or vibrations are induced in the molten metal.

2. Method according to claim 1, further comprising:
   adding material to the molten metal in the foundry crucible and
   adjusting the vertical position of the primary coil accordingly.

3. Method according to claim 2, where in the material is added through a feed device being arranged so that it is surrounded by windings of the primary coil.

4. Method according to claim 1, wherein the secondary coil is used to induce vibrations of approximately 50 Hz.

5. Method for manufacturing a metal component by additive manufacturing, the method comprising:
   providing a work surface on which the component is to be manufactured,
   providing at least one deposition material from which the component is to be composed,
   advancing the deposition material to a localized deposition area where it is added to the component being manufactured,
   providing heat to the deposition area so that a free-standing melt-pool at least comprising molten metal is provided, so that the deposition material is deposited for building up the component,
   arranging an electromagnetic primary coil movably above the molten metal,
   adjusting a vertical position of a primary coil to a predefined distance above and not in physical contact with an upper free surface of the molten metal,
   applying power to the primary coil so that an electromagnetic field is obtained,
   adjusting the vertical position of the primary coil to maintain the predefined distance, and
   maintaining the electromagnetic field for a predefined period of time so that a desired microstructure is obtained in the component being manufactured, and
   mutually moving the work surface and the deposition material in a way that results in the additive manufacturing of the component.

6. Method according to claim 1, wherein the metal is selected from the group consisting of aluminium, magnesium, titanium, zirconium, beryllium, steel, copper, nickel and cobalt.

7. Method according to claim 1, wherein the method produces a metal matrix composite comprising reinforcement made from one or more of the following: SiC, ZrO2, Y2O3, Al2O3, MgO, and AlN.

8. Method according to claim 7, wherein a characteristic size of the reinforcement is 10-1000 nm.

9. Method of manufacturing a metal matrix composite component that includes a non-metal by use of a system for contactless induction of high-frequency vibrations in a volume of molten metal during the manufacturing of a metal matrix composite component, the system including a moveably arranged electromagnetic primary coil, an adjustment means for adjusting the position of the primary coil, and a control unit for controlling the position of the primary coil to a predefined distance above and not in physical contact with an upper free surface of the molten metal during use of the system, the method comprising:
   providing a foundry crucible containing at least a molten metal of which the component is to be at least partly composed,
   arranging the electromagnetic primary coil movably above the molten metal,
   adjusting the vertical position of the primary coil to a predefined distance above and not in physical contact with an upper free surface of the molten metal,
   applying power to the primary coil so that an electromagnetic field is obtained,
   adjusting the vertical position of the primary coil to maintain the predefined distance,
   maintaining the electromagnetic field for a predefined period of time so that a desired microstructure is obtained in the component being manufactured, and
   adding material to the molten metal in the foundry crucible and adjusting the vertical position of the primary coil accordingly, wherein the material is added through a feed device being arranged so that it is surrounded by windings of the primary coil.

10. The method of claim 9, further comprising:
    arranging a secondary low-frequency electromagnetic coil around an outer circumference of the foundry crucible containing the molten metal, and
    applying power to the secondary coil so that flow and/or vibrations are induced in the molten metal.

11. Method according to claim 9, wherein the secondary coil is used to induce vibrations of approximately 50 Hz.

12. Method according to claim 9, wherein the metal is selected from the group consisting of aluminium, magnesium, titanium, zirconium, beryllium, steel, copper, nickel and cobalt.

13. Method according to claim 9, the method being used to manufacture a metal matrix composite comprising reinforcement made from one or more of the following: SiC, ZrO2, Y2O3, Al2O3, MgO, and AlN.

14. Method according to claim 9, wherein a characteristic size of the reinforcement is 10-1000 nm.

15. Method according to claim 1, wherein the metal matrix composite comprises a metal and a non-metal.

16. Method according to claim 9, wherein the metal matrix composite comprises a metal and a non-metal.

\* \* \* \* \*